Sept. 6, 1955 J. A. AMERMAN 2,717,184
CROWN AND TRAVELING BLOCK LUBRICATION SYSTEM
Filed June 1, 1953
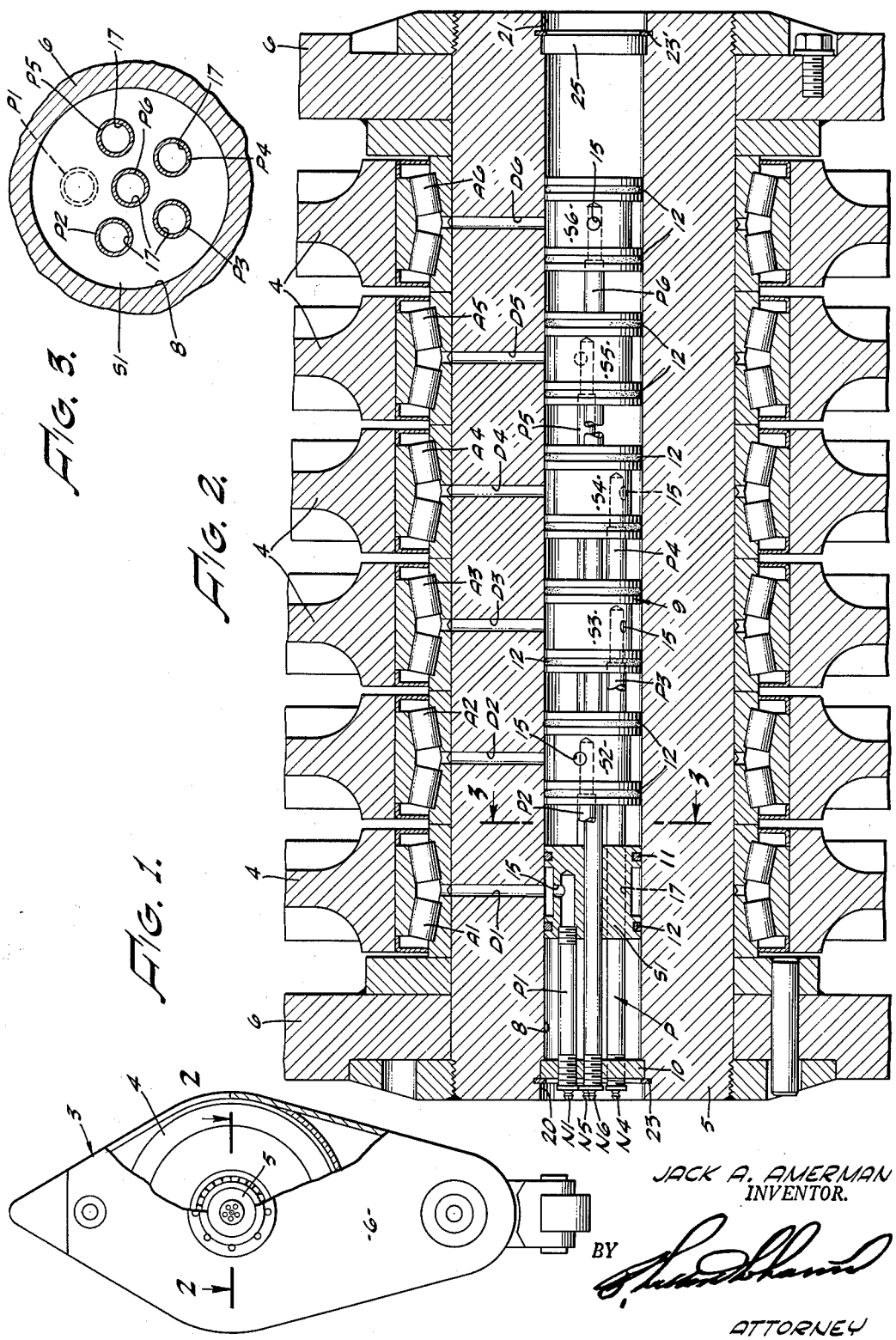
JACK A. AMERMAN
INVENTOR.
BY 
ATTORNEY

United States Patent Office 2,717,184
Patented Sept. 6, 1955

2,717,184

CROWN AND TRAVELING BLOCK LUBRICATION SYSTEM

Jack A. Amerman, Houston, Tex., assignor to Emsco Manufacturing Company, Los Angeles, Calif., a corporation of California Application June 1, 1953, Serial No. 358,699

9 Claims. (Cl. 308—187)

My invention relates to means for delivering lubricant such as grease to bearings which are arranged along a shaft, and relates in particular to means for delivering lubricant to the bearings of sheaves of crown and traveling blocks such as employed in oil well derricks.

In crown and traveling blocks it is customary to place a number of sheaves in side-by-side relation on a heavy supporting bar, referred to herein as a shaft. These sheaves are supported by roller bearings which are subjected to heavy wear, making necessary effective lubrication of the bearings. Means are ordinarily provided for individual lubrication of these bearings. One way of accomplishing this is to drill separate passages in the shaft from an end thereof, each separate passage communicating with a separate bearing. A separate grease fitting is placed at the front or outer end of each passage for use in the individual lubrication of the bearings.

It is an object of the present invention to provide a simple and relatively inexpensive means whereby the bearings of a block, such as a traveling block or a crown block may be separately supplied with grease under pressure from a grease gun, avoiding the necessity of drilling a plurality of small-diameter holes longitudinally in the shaft of the block in order to form separate grease passages therein.

It is an object of the present invention to provide a means for lubricating a plurality of bearings disposed in relatively close side-by-side relation on a shaft, comprising a single longitudinal opening extending into the shaft from at least one end thereof, relatively short lubricant passages extending somewhat radially in the shaft from each of the bearings to the longitudinal opening, and a grease distributing member insertable in the shaft opening, this member having ports therein arranged to communicate with the passages of the shaft, and having ducts extending from the respective ports to the front end of the lubricant distributing member so that lubricant may be fed individually into each of the ducts and through such ducts and the therewith connected ports and passages to the separate bearings.

It is a further object of the invention to provide a lubricating means such as described in the foregoing, wherein the shaft has an opening from end to end thereof and the lubricant distributing member is arranged to be inserted in this opening from either end thereof, making it possible to lubricate the block bearings from one side or the other thereof as may be best suited to the conditions under which the block is used.

A further object of the invention is to provide a lubricating means for a plurality of bearings disposed on a shaft, comprising a longitudinal opening in the shaft, open at least at one end, lubricant passages extending from the exterior to the opening of the shaft, and a lubricant distributing member insertable in the shaft opening, this lubricant distributing member consisting of a plurality of bodies respectively having ports for communication with the inner ends of the passages in the shaft and pipes extending respectively from the ports of the bodies to the open end of the opening, so that lubricant may be fed separately into these pipes, to be delivered individually through the pipes and the connected ports and openings to the respective bearings.

It is a further object of the invention to provide a lubricant distributing member insertable in the shaft opening, which lubricant distributing member comprises a plurality of consecutively arranged cylindrical bodies having ports therein and with the exception of the innermost or last body, having longitudinal pipe-accommodating openings through which pipes may extend from ports in the bodies toward the front end of the lubricant distributing member, so that the front ends of the pipe will be accessible through the front end of the longitudinal opening of the shaft.

Further objects and advantages of the invention may be brought out in the following part of the specification where I have described the invention in detail for the purpose of enabling others to easily understand the same, without, however, intending to limit the scope of the invention defined in the accompanying claims.

Referring to the drawings which are for illustrative purposes only:

Fig. 1 is a partly sectioned elevational view of a block embodying a preferred form of the invention;

Fig. 2 is an enlarged fragmentary section taken as indicated by the line 2—2 of Fig. 1;

Fig. 3 is a cross-sectional view, to reduced scale, taken as indicated by the line 3—3 of Fig. 2;

In Fig. 1, I show a traveling block 3 having a plurality of sheaves 4 supported on a transverse bar or shaft 5 supported between side plates 6. In this block 3 six sheaves 4 are shown which turn on the roller bearings A, respectively identified as A1 to A6, Fig. 2.

According to the invention an axial opening 8 extends into the bar. This opening 8 is shown as extending from end to end of the bar, and radial grease passages D1 to D6 are drilled in the bar in positions to respective bearings A1 to A6 with the bore 8. A lubricating distributing member 9 is inserted in the opening 8 from one end thereof. This distributing member comprises a plurality of bodies which are of generally cylindrical form and are identified as spools S1 to S6 inclusive. Each of the spools S1–S6 has annular channels 11 adjacent the ends thereof to receive sealing rings 12 which engage the wall of the opening 8 and thereby effectively seal the ends of the spools. Each of the spools has a longitudinal opening leading in from the leftward end thereof to a port 15 arranged to communicate with a lubricant passage D1 to D6. A plurality of pipes P, individually identified as pipe P1 to P6 inclusive are provided for connecting the ports 15 of the bodies S1–S6 with grease nipples N1–N6 which are respectively supported by a circular plate 10 so as to communicate with the leftward ends of the pipes P1–P6. The plate 10 constitutes the outer or leftward end of the lubricant distributing member.

With the exception of the innermost body S6, the bodies S have one or more openings extended longitudinally therethrough. These openings are referred to as pipe-accommodating openings 17 since pipes P pass therethrough. The spool S1 has five longitudinal openings 17 drilled from end to end thereof through which five pipes P2 to P6 extend in the manner shown.

The lubricant distributing member 9 is assembled in the following manner. The shortest pipe P1 is screwed into the back of the plate 10 and then the spool S1 is screwed onto the rightward end thereof. Then, the slightly longer pipe P2 is screwed into the back of the plate 10 so as to communicate with the second nipple N2, this pipe passing through one of the openings 17. The spool S2 is then screwed onto the rightward end of the pipe P2 by use of threads indicated by dotted lines 20. Pipe P3 is then passed through an opening 17 in the spool S2 and through an opening 17 in the spool S1 and is threaded into the back of the plate 10 so as to communicate with the nipple N3.

The spool S2 has four longitudinal openings 17 therein through which pipes P3 to P6 pass, in their extension from the spools S3–S6 to the plate 10. Spool S3 has three openings 17 for passage of the pipes P4 to P6 inclusive. Spool S4 has two longitudinal openings 17 for the passage of pipes P5 and P6, and spool S5 has one opening 17 through which the pipe P6 passes.

The foregoing procedure of passing pipes P through openings 17 in the previously placed spools and screwing consecutive spools onto the ends of such pipe is continued until the innermost spool S6 has been screwed onto the rightward end of the pipe P6. It will be perceived that the pipe P1 connects nipple N1 with the opening 14 in spool S1, communicating with port 15 which in turn communicates with the lubricant passage D1, which communicates with the bearing A1. Each of the pipes P2 to P6 inclusive communicates with an opening 14 with a port 15 in a corresponding spool S2 to S6 inclusive, with the result that the nipples N2 to N6 inclusive are connected with the passages D2 to D6 respectively leading to the bearings A2 to A6 inclusive. Periodically a grease gun is connected separately or individually to the nipples N1–N6 and lubricant is forced through the ducts provided by the pipes P1 to P6 and the associated ports and passages 15 and D1–D6, to amply and individually lubricate the bearings.

The ends of the opening 8 of the shaft 5 are provided with counterbores 20 and 21, each of a size to receive the plate 10 therein. The plate 10 is shown reposing in the counterbore 20 wherein it is held against a shoulder 22 by an internal snap ring 23. The opposite end of the opening 8 is closed by a plate 25 which is held in the counterbore 21 by a similar snap ring 23'. Should the conditions under which the block is used dictate the lubrication of the bearings from the rightward side of the block 3 instead of the leftward side, as shown, the lubricant member 9 may be removed from the position in which it is shown in Fig. 2 and then, after removal of the plate 25, it may be inserted in the opening 8 through the rightward end thereof, the plate 10 then being moved into the position occupied by the plate 25. The plate 25 may be then placed in the counterbore 20 to close the leftward end of the opening 8.

I claim:

1. In means for lubricating a plurality of bearings disposed on a shaft having a longitudinal opening open at at least one end, there being lubricant passages extending in said shaft from each of said bearings to said opening: a unitary lubricant distributing member insertable in said opening through said open end thereof and being of such length within said opening that it passes across the inner ends of passages in said shaft, said member having ports therein spaced therealong so that they will communicate with the inner ends of said lubricant passages when the distributing member is inserted as a unit in said opening, and ducts extending from the respective ports to the front end of said lubricant distributing member so as to receive lubricant which is to be delivered through said ports and said passages to said bearings.

2. In means for lubricating a plurality of bearings disposed on a shaft having a longitudinal opening open at at least one end, there being lubricant passages extending in said shaft from each of said bearings to said opening: a lubricant distributing member insertable in said opening through said open end thereof, said member having ports therein communicating with said lubricant passages and ducts extending from the respective ports to the front end of said lubricant distributing member so as to receive lubricant which is to be delivered through said ports and said passages to said bearings; and sealing means spaced along said lubricant distributing member between said ports to seal off said opening between said ports, there being means for preventing escape of lubricant from the ends of said opening.

3. In means for lubricating a plurality of bearings disposed on a shaft having a longitudinal opening open at at least one end, there being lubricant passages extending in said shaft from each of said bearings to said opening: a lubricant distributing member insertable into said opening through said open end thereof, said member comprising a plurality of bodies arranged along said opening, with ports therein for communication with the inner ends of said lubricant passages, annular sealing means operative between said bodies and the wall of said shaft which forms said opening, and pipes extending from said bodies and communicating respectively with the ports therein, said pipes extending through said opening toward said open end thereof so that lubricant may be fed into the front ends of said pipes to be delivered through the respective pipes, ports and passages to said bearings.

4. In means for lubricating a plurality of bearings disposed on a shaft having a longitudinal opening open at at least one end, there being lubricant passages extending in said shaft from each of said bearings to said opening: a lubricant distributing member insertable into said opening through said open end thereof, said member comprising a plurality of bodies arranged along said opening, with ports therein for communication with the inner ends of said lubricant passages, and pipes extending from said bodies and communicating respectively with the ports therein, said pipes extending through said opening toward said open end thereof so that lubricant may be fed into the front ends of said pipes to be delivered through the respective pipes, ports and passages to said bearings.

5. In means for lubricating a plurality of bearings disposed on a shaft having a longitudinal opening open at at least one end, there being lubricant passages extending in said shaft from each of said bearings to said opening: a lubricant distributing member insertable into said opening through said open end thereof, said member comprising a plurality of bodies arranged along said opening, with ports therein for communication with the inner ends of said lubricant passages, annular sealing means operative between said bodies and the wall of said shaft which forms said opening, each of said bodies, with the exception of the last body, having at least one longitudinal pipe-accommodating opening, and pipes extending from said bodies and communicating respectively with the ports therein, said pipes extending through said pipe accommodating openings of said bodies toward the open end of said opening of said shaft, so that lubricant may be fed into the front ends of said pipes to be delivered through the respective pipes, ports and passages to said bearings.

6. In means for lubricating a plurality of bearings disposed on a shaft having a longitudinal opening open at at least one end, there being lubricant passages extending in said shaft from each of said bearings to said opening: a lubricant distributing member insertable into said opening through said open end thereof, said member comprising a plurality of bodies arranged along said opening, with ports therein for communication with the inner ends of said lubricant passages, each of said bodies, with the exception of the last body, having at least one longitudinal pipe-accommodating opening, and pipes extending from said bodies and communicating respectively with the ports therein, said pipes extending through said pipe accommodating openings of said bodies toward the open end of said opening of said shaft, so that lubricant may be fed into the front ends of said pipes to be delivered through the respective pipes, ports and passages to said bearings.

7. In means for lubricating a plurality of bearings disposed on a shaft having a longitudinal opening open at at least one end, there being lubricant passages extending in said shaft from each of said bearings to said opening: a lubricant distributing member insertable into said opening through said open end thereof, said member comprising a plurality of bodies arranged along said opening, with ports therein for communication with the inner ends of said lubricant passages, each of said bodies having a pair of annular grooves spaced on the opposite sides of the port therein, with sealing rings therein for sealing engagement with the wall of said opening, and pipes extending from said bodies and communicating respectively with the ports therein, said pipes extending through said opening toward said open end thereof so that lubricant may be fed into the front ends of said pipes to be delivered through the respective pipes, ports and passages to said bearings.

8. In means for lubricating a plurality of bearings disposed on a shaft having a longitudinal opening open at at least one end, there being lubricant passages extending in said shaft from each of said bearings to said opening: a lubricant distributing member insertable into said opening through said open end thereof, said member comprising a plurality of bodies arranged along said opening, with ports therein for communication with the inner ends of said lubricant passages, each of said bodies having a pair of annular grooves spaced on the opposite sides of the port therein, with sealing rings therein for sealing engagement with the wall of said opening, each of said bodies, with the exception of the last body, having at least one longitudinal pipe-accommodating opening, the pipes extending from said bodies and communicating respectively with the ports therein, said pipes extending through said pipe accommodating openings of said bodies toward the open end of said opening of said shaft, so that lubricant may be fed into the front ends of said pipes to be delivered through the respective pipes, ports and passages to said bearings.

9. In means for lubricating a plurality of bearings disposed on a shaft having a longitudinal opening open at at least one end, there being lubricant passages extending in said shaft from each of said bearings to said opening: a unitary lubricant distributing member insertable in said opening through said open end thereof and being of such length within said opening that it passes across the inner ends of said lubricant passages in said shaft, said member having ports therein spaced therealong so that they will communicate with the inner ends of said lubricant passages when the distributing member is inserted as a unit in said opening, and ducts extending from the respective ports to the front end of said lubricant distributing member so as to receive lubricant which is to be delivered through said ports and said passages to said bearings; and sealing means arranged between said distributing member and said shaft to seal off the junctures of said ports with the respective lubricant passages in said shaft.

References Cited in the file of this patent
UNITED STATES PATENTS

| | | |
|---|---|---|
| 1,200,881 | Sargent | Oct. 10, 1916 |
| 2,014,204 | Herrmann | Sept. 10, 1935 |
| 2,191,876 | Brotherton | Feb. 27, 1940 |
| 2,274,099 | Smith et al. | Feb. 24, 1942 |
| 2,282,633 | Young | May 12, 1942 |